United States Patent Office 3,039,936
Patented June 19, 1962

3,039,936
PRODUCTION OF DEXTROSE FROM STARCH
James F. Lenney, St. Louis, Mo., and Lyman R. Shively, Wood River, Ill., assignors, by mesne assignments, to Union Starch & Refining Co., Inc., Columbus, Ind., a corporation of Indiana
No Drawing. Filed June 7, 1960, Ser. No. 34,366
15 Claims. (Cl. 195—11)

This invention relates to an enzyme conversion process for hydrolyzing starch to dextrose and to the enzyme system required for the hydrolysis.

This application is a continuation-in-part of U.S. application Serial No. 736,464, filed May 20, 1958, now abandoned.

Among the objects of the invention is the provision of a process for converting starch to dextrose in which the starch is solubilized and an essentially complete hydrolysis of the soluble carbohydrate to dextrose is attained.

The process is valuable for the production of a pure dextrose product, for example, or for the production of solutions of dextrose which may be converted directly to alcohols or other valuable industrial compounds by chemical or fermentation processes.

The objects of the invention are obtained by preliminary liquefying and partially hydrolyzing starch by a thermostable alpha-amylase and thereafter hydrolyzing the resulting intermediate products substantially completely to dextrose with an enzyme complex obtained from one of the various species of the Rhizopus genus of fungus.

Starch molecules consist primarily of polymerized dextrose. About 95% of the linkages between dextrose units in corn starch are of the alpha-1,4 type and 5% are of the alpha-1,6 type (at the branch points in amylopectin). In certain other starches this ratio may differ but the same linkages are present. There are many different enzymes capable of hydrolyzing these glucosidic linkages, but most of these enzymes are unable to hydrolyze all of the 1,4 or 1,6 bonds: either an equilibrium condition occurs at a certain degree of conversion or the enzyme is incapable of hydrolyzing certain specific linkages at various loci in the amylose or amylopectin chain. Another disadvantage of certain enzyme systems is that they contain transglycosidase activity which results in the synthesis of appreciable amounts of di- or tri-saccharides from dextrose or maltose, thereby preventing complete hydrolysis to dextrose.

One of the advantages of the enzyme systems used in this process is that they accomplish a splitting of essentially all of the 1,4 and 1,6 linkages in starch and they possess very little of this undesirable transglycosidase activity. In this connection, Rhizopus culture filtrates have been compared with culture filtrates from *Aspergillus niger*. The *A. niger* enzyme complex is noted for its good saccharifying activity and is widely used in the distilling industry. We have found that a 20 to 30% starch suspension liquefied with alpha-amylase cannot be converted beyond 96.5 D.E. using *A. niger* culture filtrate. At this maximum D.E., these hydrolysates were found to contain only dextrose and the unfermentable disaccharide, isomaltose. It was also observed that *A. niger* culture filtrate decreases the D.E of 20% dextrose solution from 100 to 96.5. Here also, paper chromatography revealed only dextrose and isomaltose. Thus *A. niger* cultures produce an enzyme which synthesizes isomaltose from dextrose and prevents complete starch conversion to dextrose. When Rhizopus culture filtrates were incubated with a 20% solution of dextrose, no drop in D.E. occurred.

There are many publications in the literature which are concerned with amylases and starch saccharification. In most of these, a low (1–5%) concentration of a modified special solubilized starch is employed (usually Lintner potato starch). Industrially, it is usually necessary to work with much higher concentrations (20–40%) of an unmodified starch. We have found that these high concentrations often saccharify differently from low starch concentrations, both qualitatively and quantitatively. High starch concentrations are much more difficult to convert completely than low concentrations with the same ratio of enzyme to starch. Also, much of the work in the literature has been done with purified enzyme preparations and it is not possible to judge whether a practical crude enzyme preparation from the same origin would behave similarly.

In the first step of the process of the invention, an aqueous starch suspension is liquefied and partially hydrolyzed with a thermostable alpha-amylase. A thermostable amylase is employed so that the starch may be gelatinized at temperatures of 65° to 80° C. without inactivating the enzyme. After the amylase has acted on the starch for a sufficient time to liquefy the latter the reaction continues if the temperature is lowered to as low as 30° C., for example.

For this purpose the commercially available alpha-amylase obtained from *Bacillus subtilis* is satisfactory. Other thermostable alpha-amylases are available and may be employed in place of amylase from *Bacillus subtilis*. Other suitable thermostable alpha-amylases have been obtained from barley malt, and pancreas, for example, and are commercially available.

The aqueous starch suspension may contain about 10–45% of starch, preferably 20 to 40% of starch. The lower proportions of starch (10–15%) are less economical because of the high volume of liquid to be handled. The reaction can be carried out with 40–45% starch although such concentrations are more difficult to handle. The alpha-amylase is added to the aqueous starch suspension and the mix is heated. During gelatinizing the alpha-amylase prevents the suspension from becoming excessively viscous. Calcium ions, in trace amounts, may be added to stabilize and activate the bacterial amylase.

After the starch suspension is liquefied, the solution may be maintained at a temperature of about 30°–80° C. until a D.E. of 25–35 is attained. Actually the reaction proceeds at temperatures as low as 10° C. although at temperatures below 30° C. the reaction rate is considered too slow for commercial production.

The action of the alpha-amylase may be allowed to go almost to completion before adding the Rhizopus enzymes. Convenient conditions for bacterial alpha amylase conversion would be, for example, 8–20 hours at pH 7 and 75° C. The amount of alpha-amylase required will depend on many factors, such as the potency of the alpha amylase preparation and the time allowed for the incubation, for example. Using a potent commercial preparation of a *B. subtilis* amylase, a concentration of 0.01 to 0.08% (based on the weight of the starch) may be employed. After this conversion, the insoluble residue may be filtered off. The filtrate has a D.E. of 25 to 35%, ordinarily gives a negative or faint brown iodine test, and has been found by paper chromatography to contain dextrose, di-, tri-, tetra-, penta-, hexa- and heptasaccharides. The insoluble residue amounts to about 2% of the weight of the starch, when commercial (about 99% pure) corn starch is hydrolyzed with bacterial amylase overnight under optimum conditions. The residue consists of starch plus most of the fatty acid and insoluble protein of the original corn starch sample.

It has previously been proposed to preliminarily liquefy starch to a D.E. of 10–50% by an acid hydrolysis and to then complete the conversion by means of an enzyme. Such a preliminary conversion step is unsatisfactory in the process of the present invention since it has been found that 25 to 50 D.E. acid hydrolysates cannot be converted beyond 90–93 D.E. even with a high concentration of a potent saccharifying enzyme system, and mildly treated acid hydrolysates (of 10–15 D.E.) cannot be converted beyond 96–97 D.E. It is believed that the explanation of this behavior is that acid hydrolysis at starch concentrations above about 5% produces reversion products having anomalous linkages which are not susceptible to enzymic attack.

It has been found that the Rhizopus enzyme preparation may be added shortly after the starch has been liquefied, long before the action of the alpha-amylase approaches completion. As an example of this modification, the alpha-amylase may be allowed to act for two hours at 75° C. and pH 7. Then the temperature is lowered to 50° C., the pH is lowered to 4.8 by the addition of an acid, and the Rhizopus enzymes are added. These conditions, which are optional for the Rhizopus enzymes, still permit the action of B. subtilis amylase to continue. In this manner, the time required for the overall conversion may be shortened by many hours. With this modified process, the insoluble residue, which amounts to 1.0 to 2.5% of the weight of the starch, is removed by filtration after the reaction of the Rhizopus enzymes has been completed.

One phase of the invention is based on the discovery that saccharifying enzyme systems from the various species of the genus Rhizopus are effective in hydrolyzing the conversion products produced in the preliminary treatment of starch to obtain 99.5 to 100% conversion of these products to dextrose. Culture filtrates have been obtained from *Rhizopus oryzae*, *R. niveus*, *R. japonicus*, *R. arrhizus*, *R. delemar*, and other representative species of the genus Rhizopus, and these culture filtrates hydrolyze the soluble products of bacterial amylase action completely or almost completely to dextrose. The time for the Rhizopus enzyme treatment is about 2–3 days and may again depend on the amount and potency of the enzyme complex added. Very satisfactory amounts of the enzyme complex are from 5 to 35 ml. of culture filtrate per 100 grams of starch employed. The incubation with the Rhizopus enzyme complex may be carried out at 35 to 55° C.

The process of this invention may also be applied to crude starch-bearing materials such as corn, potatoes, wheat and rice. The ability of Rhizopus enzymes to effect substantially complete conversion of starch to dextrose gives a maximum yield of fermentable sugar from these starchy materials.

A satisfactory culture filtrate may be obtained in the following way:

Example 1

Spores of *Rhizopus oryzae* are transferred from a potato-dextrose agar slant to 50 ml. of a sterile medium containing 2 gm. of corn meal and 2 gm. of distiller's thin stillage solids at pH 5.6. After growing for 24 hours in shake culture at 30° C., 4 ml. are transferred to a sterile medium containing 20 gm. of bran, 4 gm. of corn meal and 80 ml. of water. After still growth for four days at 30° C., the enzyme complex is obtained by adding 120 ml. of water, extracting for 3 hours and filtering.

In a similar way culture filtrates may be obtained from *R. niveus*, *R. delemar*, *R. arrhizus*, *R. japonicus*, or other Rhizopus species.

The following examples further illustrate in detail how the invention is carried out.

Example 2

220 grams of corn starch (10% moisture) were suspended in 800 ml. of water, 20 mg. of $Ca(OH)_2$ were added and the pH was adjusted to 7.0 with NaOH. 100 mg. of *B. subtilis* amylase were added and the suspension was gelatinized by heating to 75° C., with stirring. After overnight incubation at 75° C., the pH was adjusted to 4.8 with acetic acid and the insoluble residue was filtered off. The washed and dried residue weighed 4.2 grams. The filtrate had a negative iodine reaction and had a D.E. of 29.6. Five ml. of *Rhizopus oryzae* culture filtrate, prepared as in Example 1, were added to 100 ml. of this hydrolysate and the mixture was incubated at 50° C. for 3 days at pH 4.5 in the presence of 0.5 ml. of toluene. The hydroylsate was decolorized with activated carbon and had a D.E. of 99.6. Paper chromatographic analysis of this hydroylsate revealed a faint trace of panose as the only detectable carbohydrate other than dextrose.

Example 3

A *B. subtilis* starch hydroylsate filtrate was prepared as described in Example 2. It contained 0.233 gram of dry substance per ml. and had a D.E. of 33. Five ml. of *Rhizopus niveus* culture filtrate were added to 100 ml. of this hydrolysate, the pH was adjusted to 4.4 and 0.5 ml. of toluene was added. After five days at 50° C., the mixture was treated with activated carbon and was found to have a D.E. of 99.0. Traces of isomaltose and of panose were detected by paper chromatography.

With a *Rhizopus japonicus* culture filtrate prepared as in Example 1 a hydrolysate made according to Example 2 had a D.E. of 99.8. Similarly with *R. arrhizus*, the hydrolysate had a D.E. of 99.3 and with *R. delemar* a D.E. of 99.9. D.E. values of less than 99.0 can be raised above 99.5 by the use of higher Rhizopus enzyme concentrations.

Example 4

200 ml. of a corn starch suspension containing 43.5 gm. of starch were adjusted to pH 7.0 using NaOH. 9 mg. of a *B. subtilis* concentrate were added and the agitated mixture was gradually heated to 75° C. and held at 75–85° C. for 2 hours. The solution was then cooled to 48° C. and adjusted to pH 4.7 with acetic acid. 5 ml. of *Rhizopus niveus* culture filtrate were then added, the pH was readjusted to 4.7, and the suspension was incubated at 48° C. for 70 hours. An insoluble residue amounting to 1.5% of the weight of the starch was filtered off. The filtrate had a D.E. of 100, on an ash-free, protein-free basis.

Example 5

33 grams of degerminated corn meal were suspended in 125 ml. of water, 18 mg. of $Ca(OH)_2$ were added, and the pH was adjusted to 7.0. 18 mg. of *B. subtilis* amylase concentrate were added and the suspension was incubated at 72–77° C. for 2 hours. The mixture was then cooled, 5 ml. of *Rhizopus oryzae* culture filtrate were added, and the pH was adjusted to 4.7 using acetic acid. After four days at 50° C., the filtrate had a D.E. of 98.3. Allowing for the presence of 1.2% protein, the D.E. was 99.4.

Example 6

Hulled brown rice was hydrolyzed exactly as in Example 5. The final filtrate had a D.E. of 96.3, which was raised to 98.5 by subtracting the 2.0% protein content from the dry substance of the filtrate.

Other crude starchy materials were converted in this manner and gave similar results, demonstrating an essentially complete hydrolysis of their starch content to dextrose. The protein level of the final filtrate depended upon the nature of the starting material and its soluble protein content.

We claim:

1. In a process of hydrolyzing starch, the steps comprising heating an aqueous starch suspension containing about 10–45% by weight of starch to about 65°–80° C. in the presence of a thermostable alpha-amylase, maintaining the suspension within said temperature range until the starch is liquefied and thereafter maintaining the solution at a temperature of 30–80° C. until a D.E. of 25 to 35% is attained, adding a saccharifying enzyme preparation obtained from a species of the Rhizopus genus, and incubating at about 35 to 55° C. whereby a solution having a D.E. of at least 98.5, based on the soluble carbohydrate present is obtained.

2. The process as claimed in claim 1 wherein the enzyme preparation from Rhizopus is added to the aqueous starch suspension containing the thermostable alpha-amylase after the latter has been acting on said suspension long enough to liquefy it, and thereafter incubating the mixture until the soluble carbohydrate material attains a D.E. of at least 98.5.

3. The process as claimed in claim 1 wherein said enzyme preparation is derived from *Rhizopus oryzae*.

4. The process as claimed in claim 1 wherein said enzyme preparation is derived from *Rhizopus niveus*.

5. The process as claimed in claim 1 wherein said enzyme preparation is derived from *Rhizopus delemar*.

6. The process as claimed in claim 1 wherein said enzyme preparation is derived from *Rhizopus japonicus*.

7. The process as claimed in claim 1 wherein said enzyme preparation is derived from *Rhizopus arrhizus*.

8. The process as claimed in claim 1 wherein the starch is present in a crude, impure form as in grains and tubers.

9. The process as claimed in claim 2 wherein said enzyme preparation is derived from *Rhizopus oryzae*.

10. The process as claimed in claim 2 wherein said enzyme preparation is derived from *Rhizopus niveus*.

11. The process as claimed in claim 2 wherein said enzyme preparation is derived from *Rhizopus delemar*.

12. The process as claimed in claim 2 wherein said enzyme preparation is derived from *Rhizopus japonicus*.

13. The process as claimed in claim 2 wherein said enzyme preparation is derived from *Rhizopus arrhizus*.

14. The process as claimed in claim 2 wherein the starch is present in a crude, impure form as in grains and tubers.

15. In a process of hydrolyzing starch, the steps comprising heating an aqueous starch suspension containing about 10–45% by weight of starch to about 65°–80° C. in the presence of a thermostable alpha-amylase, maintaining the suspension within said temperature range until the starch is liquefied and thereafter maintaining the solution at a temperature of 30–80° C. until a D.E. of 25 to 35% is attained, adding a culture filtrate of the saccharifying enzyme system obtained from a species of the Rhizopus genus, and incubating at about 35 to 55° C. whereby a solution having a D.E. of at least 98.5, based on the soluble carbohydrate present is obtained.

References Cited in the file of this patent

UNITED STATES PATENTS 2,567,000   Wallerstein et al.  _____ Sept. 4, 1951
2,583,451   Wallerstein et al.  _____ Jan. 22, 1952

OTHER REFERENCES

Erb et al.: "Ind. and Eng. Chem.," 38, 1946, pp. 792–794. POSL:TP–1–A58.

Foster: "Chemical Activities of Fungi," 1949, Academic Press Inc., New York, N.Y., page 41. POSL:QK–601–F6.

Sumner et al.: "The Enzymes," The Academic Press Inc., 1952, vol. I, part 1, p. 699, vol. II, part 2, pp. 1218–1221. POSL:QP–601–S88e.